(12) United States Patent
Wybenga et al.

(10) Patent No.: US 7,486,672 B2
(45) Date of Patent: Feb. 3, 2009

(54) APPARATUS AND METHOD FOR SEARCHING TRIE TREES USING MASKS WITH NON-SYMBOL BOUNDARIES AND FLOODING DEFAULT ROUTES IN A MASSIVELY PARALLEL ROUTER

(75) Inventors: Jack C. Wybenga, Plano, TX (US); Patricia K. Sturm, Marion, IA (US); Patrick W. Ireland, Sanger, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 11/015,737

(22) Filed: Dec. 17, 2004
(Under 37 CFR 1.47)

(65) Prior Publication Data
US 2005/0232264 A1    Oct. 20, 2005

Related U.S. Application Data

(60) Provisional application No. 60/563,700, filed on Apr. 20, 2004.

(51) Int. Cl.
*H04L 12/28* (2006.01)
*H04L 12/56* (2006.01)

(52) U.S. Cl. ..................................... 370/389

(58) Field of Classification Search ................. 370/389, 370/400, 338, 406, 392, 408, 351, 356, 241, 370/256, 428, 395, 412, 419, 386, 401; 709/238, 709/201, 245, 247; 707/100–102, 205, 2–4
See application file for complete search history.

(56) References Cited

U.S. PATENT DOCUMENTS

| | | | | | |
|---|---|---|---|---|---|
| 4,731,676 | A | * | 3/1988 | Berlekamp | .................... 360/26 |
| 5,088,091 | A | * | 2/1992 | Schroeder et al. | ........... 370/406 |
| 5,138,615 | A | * | 8/1992 | Lamport et al. | ............. 370/400 |
| 6,636,499 | B1 | * | 10/2003 | Dowling | ..................... 370/338 |
| 6,985,483 | B2 | * | 1/2006 | Mehrotra et al. | ............ 370/389 |
| 7,180,887 | B1 | * | 2/2007 | Schwaderer et al. | ........ 370/351 |
| 7,349,415 | B2 | * | 3/2008 | Rangarajan et al. | ......... 370/408 |
| 7,356,033 | B2 | * | 4/2008 | Basu et al. | .................. 370/392 |
| 7,418,463 | B2 | * | 8/2008 | Verma et al. | ................ 707/202 |

(Continued)

*Primary Examiner*—Wing F Chan
*Assistant Examiner*—Prenell P Jones

(57) ABSTRACT

A router comprising a switch fabric and routing nodes coupled to the switch fabric. Each routing node comprises a trie tree search table for storing routing information associated with received variable length subnet masks. The trie tree search table comprises a plurality of stages that are searched by N-bit address symbols derived from the received variable length subnet masks. Each routing node also comprises a control processor for generating the stages associated with the trie tree search table. The control processor generates for each entry in a first one of the plurality of stages: 1) an end flag indicating whether each entry is a leaf or a branch; 2) a subnet flag indicating whether a subnet mask ends at each entry; and 3) a masked flag indicating whether a subnet mask ending at each entry ends on a boundary of an N-bit address symbol associated with entry.

20 Claims, 13 Drawing Sheets

U.S. PATENT DOCUMENTS

| | | | | |
|---|---|---|---|---|
| 2002/0141403 A1* | 10/2002 | Akahane et al. | ............ | 370/389 |
| 2003/0091043 A1* | 5/2003 | Mehrotra et al. | ............ | 370/389 |
| 2004/0243563 A1* | 12/2004 | Heiner et al. | ................. | 707/3 |
| 2004/0249803 A1* | 12/2004 | Vankatachary et al. | ......... | 707/3 |
| 2005/0063407 A1* | 3/2005 | Wybenga et al. | ............ | 370/428 |
| 2005/0226235 A1* | 10/2005 | Kumar et al. | ............... | 370/386 |
| 2005/0265307 A1* | 12/2005 | Wybenga et al. | ............ | 370/351 |
| 2006/0133389 A1* | 6/2006 | Wybenga et al. | ............ | 370/401 |
| 2006/0135167 A1* | 6/2006 | Wybenga et al. | ............ | 455/445 |

\* cited by examiner

APPARATUS AND METHOD FOR SEARCHING TRIE TREES USING MASKS WITH NON-SYMBOL BOUNDARIES AND FLOODING DEFAULT ROUTES IN A MASSIVELY PARALLEL ROUTER

CROSS-REFERENCE TO RELATED APPLICATIONS AND CLAIM OF PRIORITY

The present invention is related to that disclosed in U.S. Provisional Patent Application Ser. No. 60/563,700, filed on Apr. 20, 2004, entitled "Extending the Trie Tree Search to Masks With Non-Nibble Boundaries and Flooding of Default Routes." Provisional Patent Application Ser. No. 60/563,700 is assigned to the assignee of the present application. The subject matter disclosed in Provisional Patent Application Ser. No. 60/563,700 is hereby incorporated by reference into the present disclosure as if fully set forth herein. The present invention claims priority under 35 U.S.C. §119(e) to U.S. Provisional Patent Application Ser. No. 60/563,700.

TECHNICAL FIELD OF THE INVENTION

The present invention is generally directed to distributed architecture routers and, in particular, to a massively parallel router that uses subnet masks that do not lie on nibble boundaries.

BACKGROUND OF THE INVENTION

There has been explosive growth in Internet traffic due to the increased number of Internet users, various service demands from those users, the implementation of new services, such as voice-over-IP (VOIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

Traditionally, a single processor is used to forward all packets in a router or switch. Even in routers with multiple forwarding table lookup threads, these threads are under control of a single processor and use a single forwarding table. Thus, conventional routers retain route information in a central location and do not distribute route information within the router. Also, since many prior art routers do not have multiple routing nodes, these routers do not experience the problems that arise when a distributed architecture combines routing nodes with small table space with more powerful routing nodes in a large route capacity router.

The main disadvantage of prior art routers is the inability to handle line rate forwarding for high bandwidth links, such as 10 Gbps interfaces. This is especially true for the longest prefix matches encountered when forwarding IPv6 packets. Also, when the table space limitations of current routers are exceeded, the routers drop routes from their routing tables or cease to learn new routes. Thus, conventional routers drop packets that would be routable if adequate table space were available. Conventional routers may use a default route instead of dropping a packet. But there is only one default route for the whole router, so the chances of successfully routing the packet are small. If no default route is defined, conventional routers drop the packets.

The applicants and the assignee of the present application have filed patent applications disclosing a number of solutions to the problems associated with prior art routers. These patent applications include 1) U.S. patent application Ser. No. 10/431,770, entitled "Apparatus and Method for Combining Forwarding Tables in a Distributed Architecture Router", filed on May 8, 2003; 2) U.S. patent application Ser. No. 10/655,192, entitled "Apparatus and Method for Classifying Traffic in a Distributed Architecture Router", filed on Sep. 4, 2003; 3) U.S. patent application Ser. No. 10/658,977, entitled "Apparatus and Method for Performing High-Speed Lookups in a Routing Table", filed on Sep. 10, 2003; 4) U.S. patent application Ser. No. 10/794,506, entitled "Apparatus and Method for Forwarding Mixed Data Packet Types in a High-Speed Router", filed on Mar. 5, 2004; and 5) U.S. patent application Ser. No. 10/832,010, entitled "Apparatus and Method for Route Summarization and Distribution in a Massively Parallel Router", filed on Apr. 26, 2004. The disclosures and teachings of U.S. patent application Ser. Nos. 10/431,770, 10/655,192, 10/658,977, 10/794,506, and 10/832,010 are hereby incorporated by reference into the present disclosure as if fully set forth herein.

Each of these previously filed applications solves some of the problems of large forwarding table indices and large numbers of routes. U.S. patent application Ser. Nos. 10/431,770 and 10/655,192 provide optimal solutions for line rates up to at least 1 Gbps. U.S. patent application Ser. Nos. 10/658,977 and 10/794,506 provide two different solutions for line rates up to at least 10 Gbps. U.S. patent application Ser. No. 10/658,977 provides a pipelined approach and U.S. patent application Ser. No. 10/794,506 provides a parallel processing approach. Finally, U.S. patent application Ser. No. 10/832,010 provides a technique for reducing the number of routes through route summarization and using default routes to implement an "always route" approach.

However, the routers described in U.S. patent application Ser. Nos. 10/431,770, 10/655,192, 10/658,977, 10/794,506, and 10/832,010 implement trie tree search tables in which each stage of the trie tree consumes one nibble (i.e., 4 bits) of the subnet mask. This is unnecessarily limiting. It is desirable to use subnet masks of arbitrary lengths, rather than using only masks that are integer multiples of four bits.

Also, the route summarization techniques disclosed in U.S. patent application Ser. No. 10/832,010 use default routes to support an "always route" technique, wherein data traffic packets associated with an unknown route are forwarded along a known route having a similar prefix (i.e., a prefix matching in as many most significant bits as possible). That technique assumed that other routers along the known route may have more information about the unknown route since these other routers already know a similar route. However, conventional techniques for distributing the known and unknown routes to trie tree search tables are slow and require the use of many processing resources.

Therefore, there is a need in the art for improved high-speed routers. In particular, there is a need for a high-speed router that implements a trie tree search table that can be searched using subnet masks that do not lie on nibble boundaries. There is a further need for an improved technique for flooding a trie tree search table with default route information.

SUMMARY OF THE INVENTION

The present invention provides a unique and non-obvious router architecture that handles subnet masks that do not lie on nibble boundaries and that efficiently floods longest prefix default route information through the stages of a trie tree search table. The embodiment of the present invention disclosed herein uses control plane processors to build and fill the stages of the trie tree search tables. Advantageously, there is no adverse impact from using non-nibble subnet masks. The data plane processors and software traverse the trie tree structure until a leaf is reached.

Accordingly, to address the above-discussed deficiencies of the prior art, it is a primary object of the present invention to provide a router for interconnecting external devices coupled to the router. According to an advantageous embodiment of the present invention, the router comprises 1) a switch fabric; and 2) a plurality of routing nodes coupled to the switch fabric. Each of the plurality of routing nodes comprises: i) a trie tree search table for storing routing information associated with received variable length subnet masks, wherein the trie tree search table is comprised of a plurality of stages that are searched by N-bit address symbols derived from the received variable length subnet masks; and ii) a control processor capable of generating the plurality of stages associated with the trie tree search table. The control processor generates for each entry in a first one of the plurality of stages: 1) an end flag indicating whether each entry is a leaf or a branch; 2) a subnet flag indicating whether a subnet mask ends at each entry; and 3) a masked flag indicating whether a subnet mask ending at each entry ends on a boundary of an N-bit address symbol associated with entry.

According to one embodiment of the present invention, the N-bit address symbols comprise 4-bit address nibbles.

According to another embodiment of the present invention, the control processor determines default routing information to be stored in entries in the first stage according to values of end flags, subnet flags, and masked flags associated with the entries in the first stage.

According to still another embodiment of the present invention, the control processor determines the default routing information to be stored in the entries in the first stage according to a value of an end flag associated with an entry in a preceding stage associated with the first stage.

According to yet another embodiment of the present invention, the control processor stores in a first entry in the first stage a first default route associated with a first entry in the preceding stage if a subnet flag associated with the first entry in the preceding stage indicates that a subnet mask ends at the first entry in the preceding stage.

According to a further embodiment of the present invention, the control processor stores in the first entry in the first stage a second default route associated with the first entry in the first stage if a subnet flag associated with the first entry in the first stage indicates that a subnet mask ends at the first entry in the first stage.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
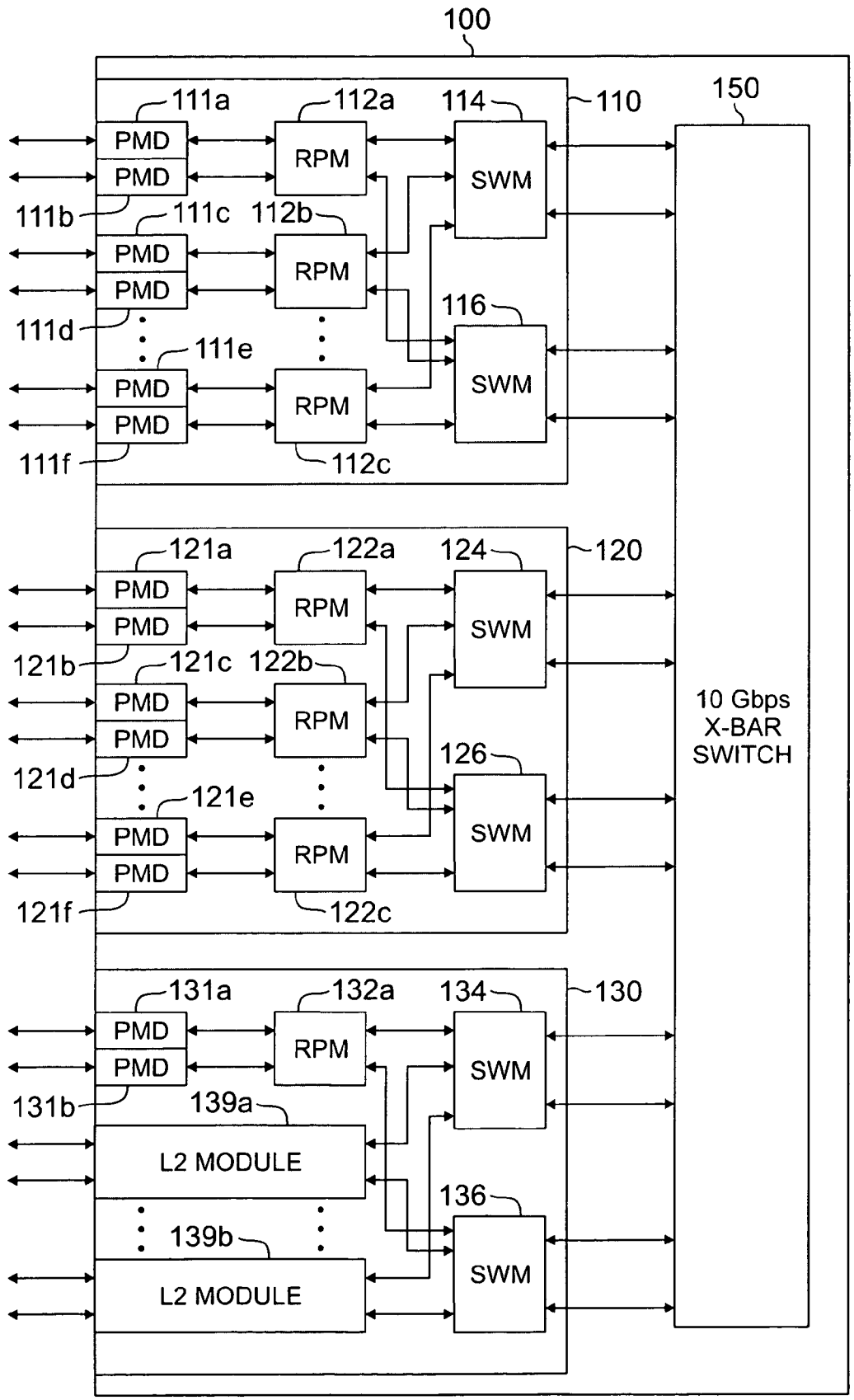
FIG. 1 illustrates an exemplary distributed architecture router, which distributes forwarding table lookup operations across a plurality of microengines and threads according to the principles of the present invention.

FIG. 1 illustrates exemplary distributed architecture router 100, which summarizes and distributes route information across plurality of routing nodes according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
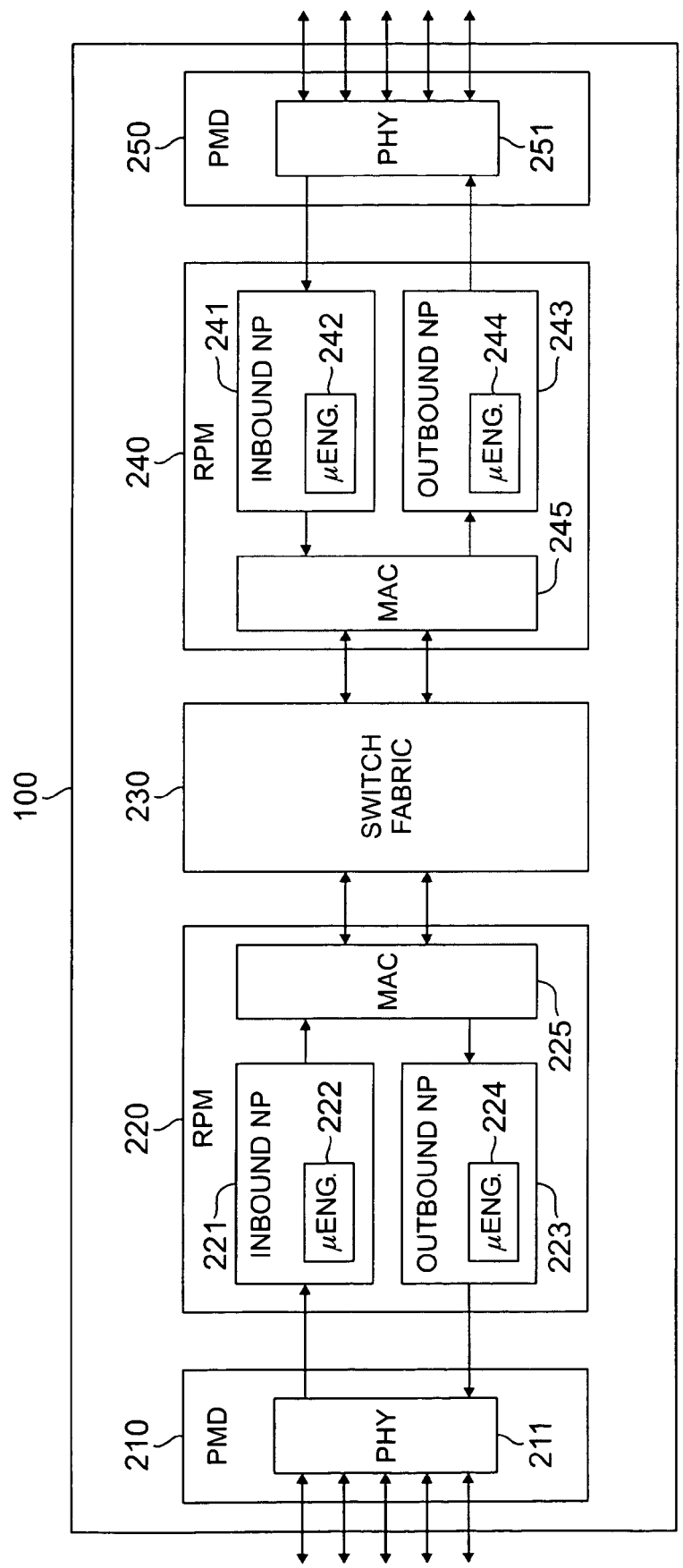
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
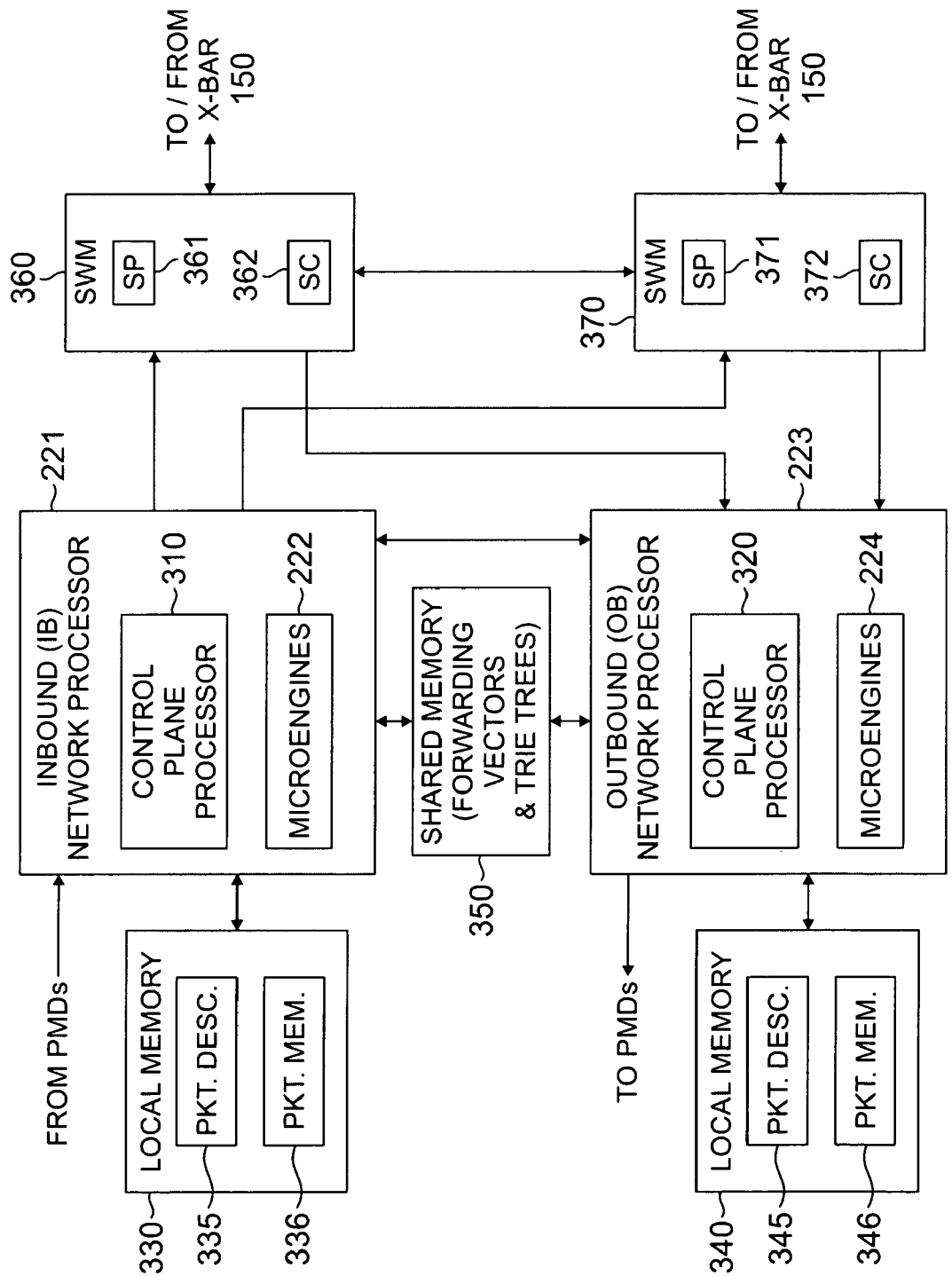
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through 10 Gigabit optical links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." U.S. patent application Ser. No. 10/794,506 was incorporated by reference above. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the illustrated embodiment, router 100 distributes the routing and forwarding functions among many routing nodes. To reduce the control plane communications bandwidth required for the internal distribution of routes, router 100 aggregates routes using a route summarization mechanism according to the principles of the present invention. Router 100 also supports summarization of external routes to allow internal routing nodes with limited table space to be used within router 100 and to reduce the forwarding table size requirements and forwarding lookup depth. Some of the routing nodes (i.e., the L2 nodes) have small size Layer 3 forwarding tables, so aggressive route summarization supports the large route capacity (nominally, one million routes) provided by router 100.

As noted above, router 100 implements an "always route" approach, in which data packets are sent to an external router that is expected to have more information about how to route the data packet. Use of aggressive route summarization, together with the "always route" approach, allows a reduction in forwarding table size. This reduces the amount of expensive, high-speed memory needed and avoids (or diminishes) the board layout limitations and complexity associated with high-speed memory devices.

Router 100 shares routing information in the form of aggregated routes among all of the RPM and L2M routing engines. Each routing node sends its route information to the Master SWM, which distributes it to all of the routing nodes. To reduce the control plane bandwidth needed to distribute the routing information within router 100 and to reduce the forwarding table size required in each routing node, aggregated routes are used. To meet the limited Layer 3 forwarding capability of the L2Ms aggressive route summarization is needed.

According to an exemplary embodiment of the present invention, the control plane processors in router 100 (e.g., switch processor (SP) 361 in SWM 360, SP 371 in SWM 370, CPP 310 in IB NP 221, CPP 320 in OB NP 223, system processors of the L2 modules) perform the route summarization functions. Typically, the routing protocols run in CPP 310 of IB NP 221, although each protocol may be allocated to either of IB NP 221 or OB NP 223.

The RPM and L2 module control plane processors build the forwarding tables used by the data plane processors. In the case of the RPMs, one of the network processors—typically the inbound network processor—builds the forwarding tables with support from the other network processor. Microengines 222 in IB NP 221 and microengines 224 in OB NP 223 use the forwarding tables to forward packets. The L2 modules learn Layer 2 routes from the traffic and from a Rapid Spanning Tree Protocol (RSTP). The switch processor builds Layer 3 routes and hardware performs the packet forwarding.

Route summarization according to the principles of the present invention amounts to shortening the prefix used in forwarding the packet. In other words, router 100 drops some of the least significant subnet bits. This process also is called route aggregation, since many routes are combined into a single route. The control software executed by the control plane processor (e.g., CPP 310) of each RPM and L2 module sends the learned Layer 3 routes to a Master switch module (SWM). One of the switch modules (e.g., SWM 360, or SWM 370) may be designated as the master switch module. The control plane processors in the RPMs and in the L2Ms perform route summarization on routes they learned through their routing protocols, through provisioning, and through internal route distribution via the Master SWM. All routes to the same RPM may be summarized in other RPMs and L2Ms since it only is necessary to deliver packets to the RPM associated with the destination port. The destination RPM can deliver them to the correct port. Also, routes to the same local output port may be summarized. The Master SWM does internal route summarization and sends the aggregated (or summarized) routes to all the RPMs and L2 modules. These summarized routes can be distributed via broadcast or unicast messaging by the Master SMW. The RPMs and L2 modules then build the forwarding table entries for these summarized routes.

To better illustrate route summarization according to the principles of the present invention, an example is now described for IPv4 data packet forwarding. However, it should be understood that similar techniques apply to other packet types, such as IPv6 and MPLS.

Figure 4A:
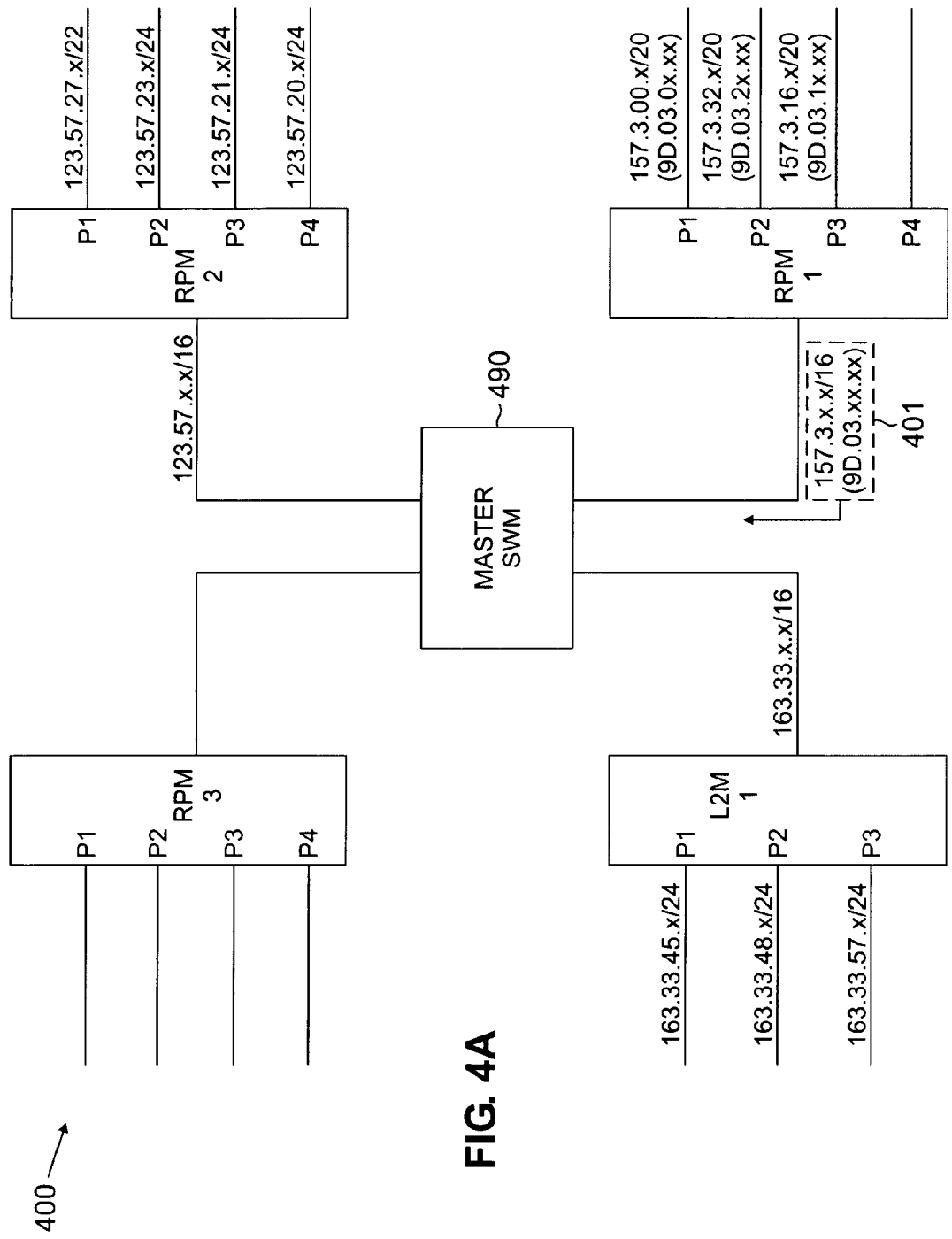
FIGS. 4A-4D illustrate internal route summarization according to the principles of the present invention.

FIGS. 4A-4D illustrate internal route summarization according to the principles of the present invention. In FIG. 4A, three route processing modules, labeled RPM 1, RPM 2 and RPM 3, and a Layer 2 module, labeled L2M 1, are shown coupled to master switch module (SWM) 490. Master SWM 490 may be any one of switch modules 114, 116, 124, 126, 134, 136 in the routing nodes of router 100. The external interfaces show the subnets supported on each port (P1, P2, P3, etc.) and the internal interfaces to master SWM 490 show the mapping of subnets to each RPM and L2M. In FIGS. 4A-4D, master SWM 490 is the device that determines and distributes the internal subnet masks for each RPM and L2M.

In FIG. 4A, RPM 1, RPM 2, RPM 3 and L2M 1 are in initial state 400. In initial state 400, RPM 1 already has three routes, one each on ports P1, P2 and P3. The routes are represented as a subnet mask in decimal format and in hexadecimal format (in parentheses). Port P1 of RPM 1 is associated with a route having the external 20-bit subnet mask 157.3.00.x/20 (9D.03.0x.xx). Port P2 of RPM 1 is associated with a route having the external 20-bit subnet mask 157.3.32.x/20 (9D.03.2x.xx). Port P3 of RPM 1 is associated with a route having the external 20-bit subnet mask 157.3.16.x/20 (9D.03.1x.xx). Port P4 of RPM 1 is not yet associated with a route.

In initial state 400, RPM 3 has no routes. On RPM 2, Ports P1, P2, P3 and P4 are associated with routes having the external 22-bit and 24-bit subnet masks 123.57.27.x/22, 123.57.23.x/24, 123.57.21.x/24, and 123.57.20.x/24, respectively. On L2M 1, Ports P1, P2 and P3 are associated with routes having the external 24-bit subnet masks 163.33.45.x/24, 163.33.48.x/24 and 163.33.57.x/24, respectively.

In initial state 400, the external subnet masks for RPM 1 are 20 bits in length, but the internal subnet mask 401 determined by the control plane processor of RPM 1 or by the master SWM 490 is 16 bits in length. If these routes were learned directly by RPM 1 through provisioning or via routing protocols operating in RPM 1, then RPM 1 can summarize them before sending them to the Master SWM. If these routes were learned by different RPMs, then the individual RPMs send the component routes to the Master SWM, which performs the summarization. The initial internal subnet mask 401 for RPM 1 is 157.3.x.x/16 (9D.03.xx.xx). Similarly, the initial internal subnet mask for RPM 2 is 123.57.x.x/16 and the initial internal subnet mask for L2M 1 is 163.33.x.x/16. In the remainder of this example, new routes will be added only to RPM 1 and RPM 3 and the internal subnet masks for RPM 2 and L2M 1 will remain unchanged.

In initial state 400, RPM 3, RPM 2 and L2M 1 send any packets having a prefix starting with 157.3 to RPM 1. Thus, the forwarding tables of RPM 3, RPM 2 and L2M 1 have only a single entry with a mask of length 16 for RPM 1. This allows RPM 3, RPM 2 and L2M 1 to deliver packets correctly to RPM 1. RPM 1 has three entries in its forwarding table, each with a mask of 20 bits. This permits RPM 1 to deliver packets to the correct interface. Thus, there is a saving of two (2) routes in all of the forwarding tables, except for the RPM 1 table. Control plane bandwidth is conserved, since only one route for RPM 1 must be distributed. Similar savings occur for the RPM 2 and L2M 1 routes. In addition to saving forwarding table space, this summarization reduces the workload on the data plane processors by reducing the number of stages in the tree search by one, since there is one less nibble in the prefix.

Figure 4B:
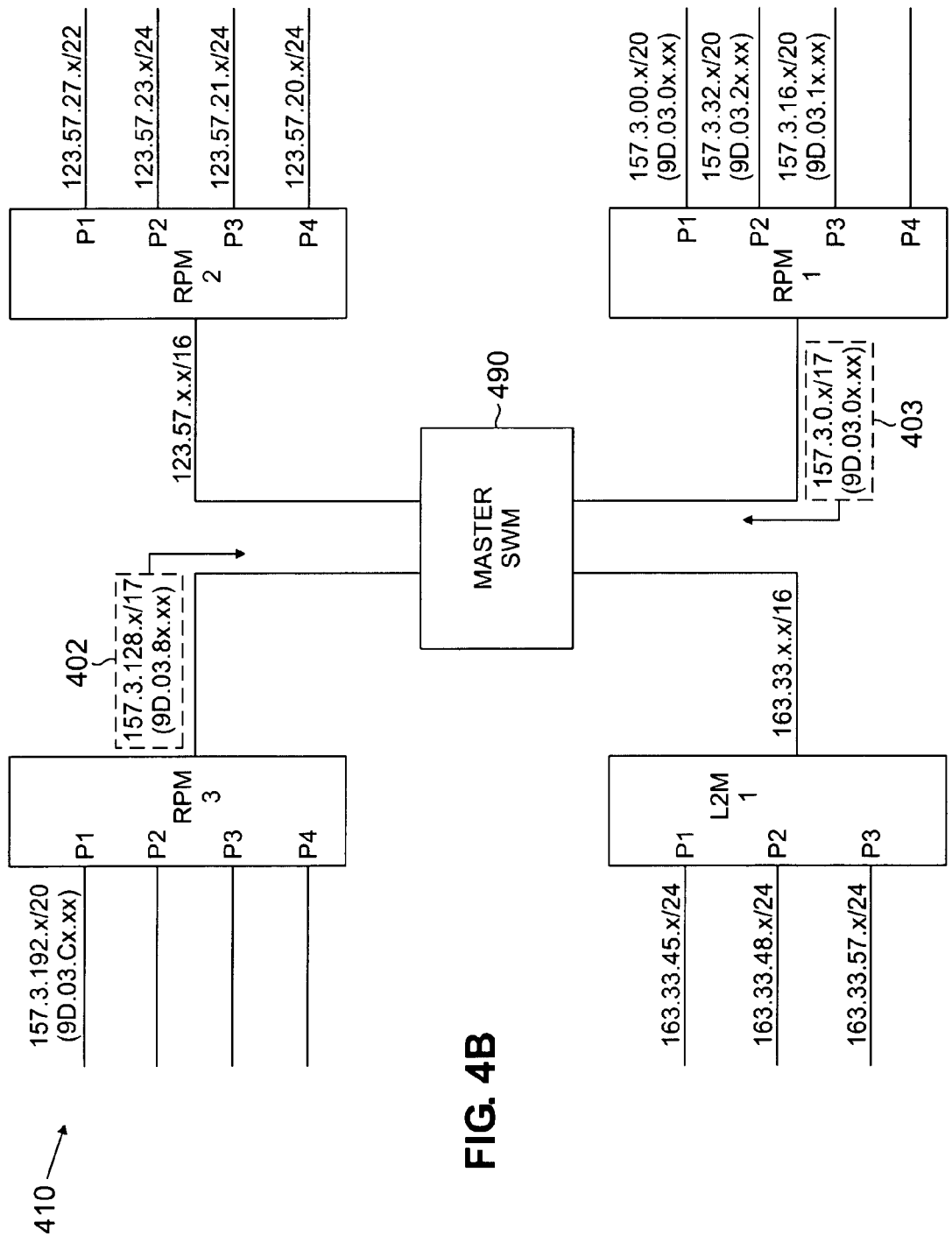

In FIG. 4B, RPM 1, RPM 2, RPM 3 and L2M 1 have entered a second state, namely state 410. In state 410, RPM 3 has learned a first route (on Port P1). Port P1 of RPM 3 is associated with a route having the external 20-bit subnet mask 157.3.192.x/20 (9D.03.Cx.xx). At this point, RPM 1 and RPM 3 both have routes beginning with the 16-bit prefix 157.3 (9D.03), so it is necessary to further differentiate these routes internally. If the master SWM summarized these routes, it will recompute the summarized routes and distribute them. If RPM 1 summarized these routes, it will recognize a conflict by the new route distributed by the master SWM and either recompute the summarized routes or send its component routes to master SWM 490 for summarization. In this example it is assumed that master SWM is performing the summarization.

The internal subnet mask 402 for RPM 3 is 157.3.128.x/17 (9D.03.8x.xx). Master SWM 490 modifies the internal subnet mask 401 of RPM 1 by adding one more bit to give the new internal 17-bit subnet mask 403. The new internal subnet mask 403 for RPM 1 is 157.3.0.x/17 (9D.03.0x.xx). The third byte of mask 403 is 0xxx xxxx for RPM 1 and the third byte of mask 402 is 1xxx xxxx for RPM 3. Now each RPM and L2M can deliver packets with a 157.3.x.x prefix to the correct RPM. There still is a savings in the number of internal routes because the three routes known to RPM 1 are reduced to 1 route for the other RPMs and L2Ms. As before, the other RPMs and L2Ms only need to get the data packets to the correct RPM and the RPM gets the data packet to the correct port.

Figure 4C:
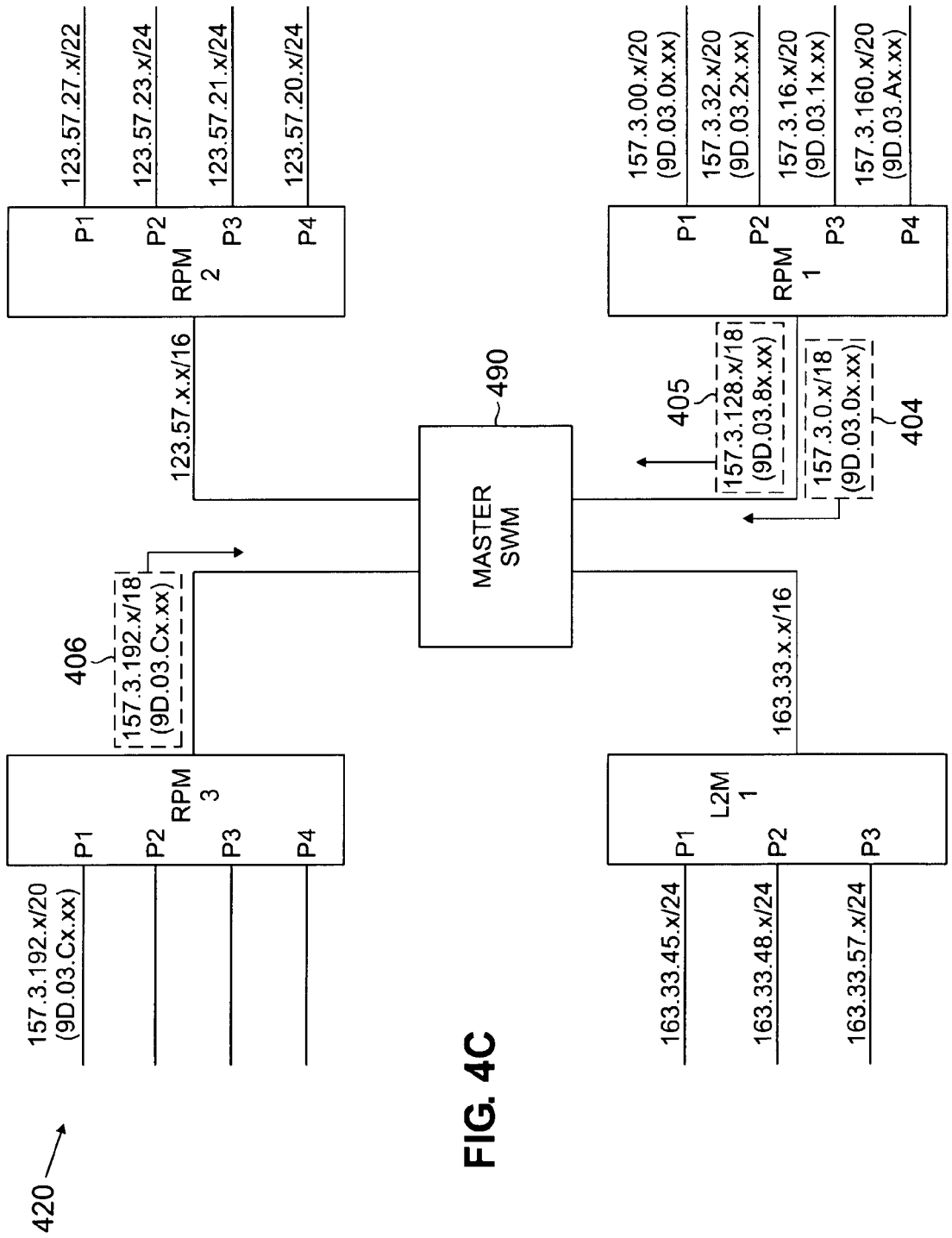

In FIG. 4C, RPM 1, RPM 2, RPM 3 and L2M 1 are in a third state, namely state 420. In state 420, RPM 1 has learned a fourth route (on Port P4). Port P4 of RPM 1 is associated with a route having the external 20-bit subnet mask 157.3.160.x/20 (9D.03.Ax.xx). This route conflicts with the RPM 3 prefix, so master SWM 490 makes additional changes to the internal routes to resolve this conflict. The conflict may be resolved by noting that the first two bits of the third byte are 11 for RPM 3 and are either 00 or 10 for RPM 1. Thus, master SWM 490 changes the prefixes to 18 bit prefixes.

In this case, RPM 3 still only needs one route, but RPM 1 needs two routes, to cover the two cases for the first two bits of the third byte. Thus, master SWM 490 replaces the internal subnet mask 403 of RPM 1 with two new internal 18-bit subnet masks 404 and 405. The new internal subnet mask 404 for RPM 1 is 157.3.0.x/18 (9D.03.0x.xx). The new internal subnet mask 405 for RPM 1 is 157.3.128.x/18 (9D.03.8x.xx). Master SWM 490 also replaces the internal subnet mask 402 of RPM 3 with new internal 18-bit subnet mask 406. The new internal subnet mask 406 for RPM 3 is 157.3.192.x/18 (9D.03.Cx.xx).

There still is a savings, in that each RPM and L2M in the system only needs two routes for RPM 1, instead of four, thus conserving forwarding table space in each of the other RPMs and L2Ms. In addition, only two routes must be distributed for RPM 1, instead of four, thus conserving control plane bandwidth.

Figure 4D:
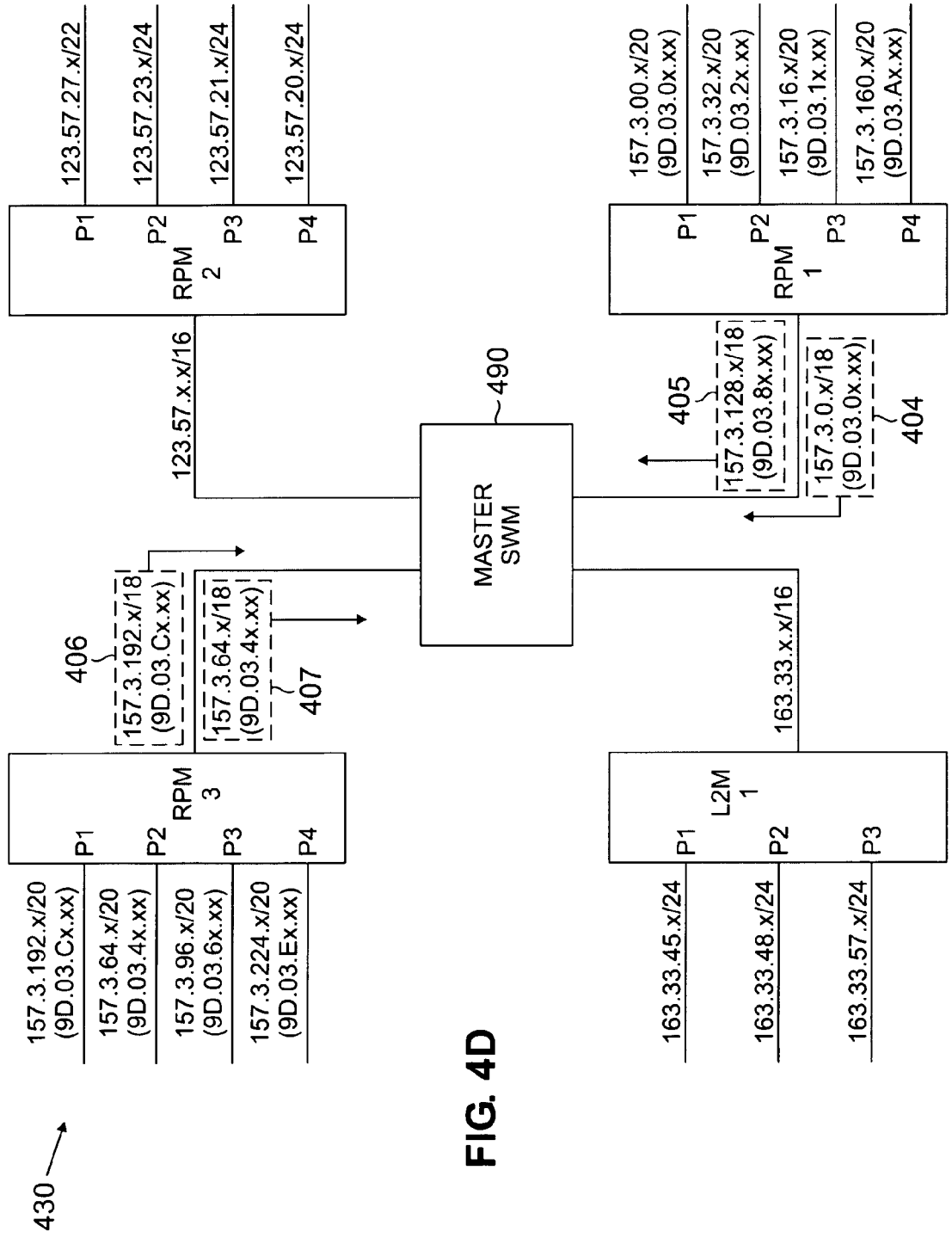

In FIG. 4D, RPM 1, RPM 2, RPM 3 and L2M 1 are in a fourth state, namely state 430. In state 430, RPM 3 has learned three new routes (on Ports P2, P3 and P4). Now, for some of the routes on RPM 3, the first two bits of the third byte are 01. Thus, a new internal subnet mask is needed for RPM 3. Master SWM 490 adds a new internal subnet mask 407 for RPM 3. The new internal subnet mask 407 for RPM 3 is 157.3.64.x/18 (9D.03.4x.xx). Now the savings is two prefixes for RPM 1 and two prefixes for RPM2.

L2M 1 has limited table space and may be subjected to more aggressive summarization. For example, L2M 1 may use a 16-bit mask, 157.3.x.x/16 (9D.0.3.xx.xx), for all of states 400, 410, 420 and 430. Thus, the L2M makes forwarding mistakes by forwarding RPM 3 packets to RPM 1. Since RPM 1 has more complete knowledge of the prefix, it corrects the mistake and forwards the packet on to RPM 3. Thus, the problem is corrected at the expense of one extra hop through router 100.

Advantageously, if internal route summarization reduces the number of nibbles in the prefix, then it also reduces the number of required stages in the trie tree search. This reduces the workload on the data plane processors in forwarding packets.

Figure 5:
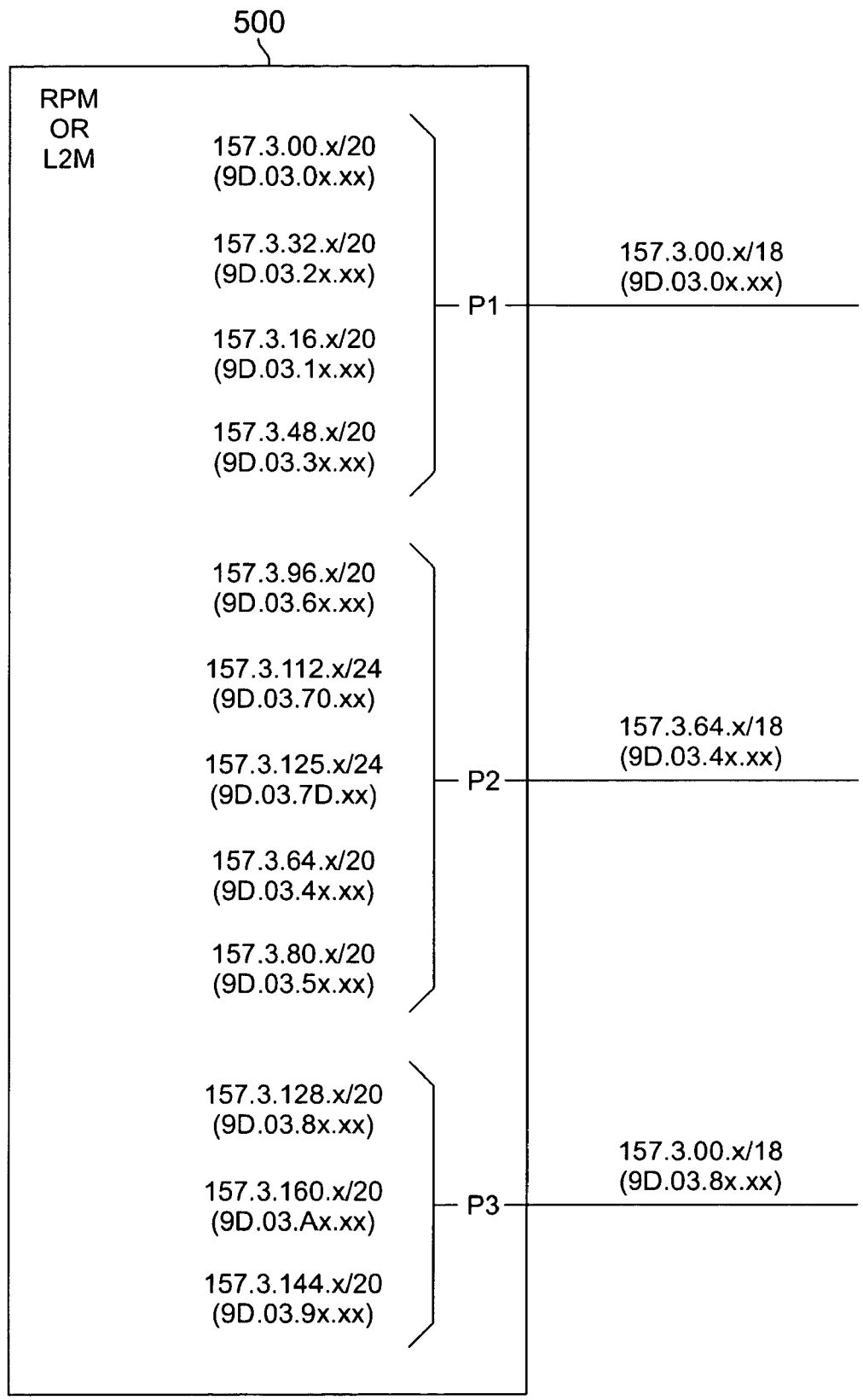
FIG. 5 illustrates external route summarization according to the principles of the present invention.

FIG. 5 illustrates external route summarization according to the principles of the present invention. In FIG. 5, module 500 may represent either a route processing module (RPM) or a Layer 2 (L2) module, as described above. External route summarization is similar to internal route summarization in that it amounts to shortening the prefix used in forwarding the data packet. However, unlike internal route summarization, external route summarization may be visible to the external networks coupled to router 100. The control plane processor (CPP) in the RPM or the L2M that builds the forwarding table performs external route summarization.

In FIG. 5, the port markings external to module 500 show the forwarding table entry associated with each port (e.g., P1, P2, P3) and the routes listed inside the RPM or L2M block show the routes learned by the RPM or L2M. The port markings represent the prefixes of all of the routes that are output to the port. The examples in this section are for IPv4 forwarding, but similar techniques apply to other packet types, such as IPv6 and MPLS.

The first type of external route summarization performed by module 500 is simple aggregation, wherein a complete set of routes of a given mask length are summarized into a single route with a shorter mask. Port 1 illustrates this type of summarization. On Port 1, four internal routes, each with a 20-bit prefix, are summarized into a single route with an 18-bit prefix. The 20-bit internal prefixes begin with the same two bytes, namely [9D.0.3 . . . ]. The third bytes for the four internal routes are [0000xxxx], [0001xxxx], [0010xxxx] and [0011xxxx]. Since the first two bits of all of the third bytes are all [00], the external 18-bit prefix begins with the 3-byte sequence [9D.0.3.0x . . . ], where the third byte is equal to [00xxxxxx]. Since all of the possible subnets of the main 18-bit prefix are known, there is no misrouting. The same packets will be delivered to the interface regardless of whether the summarization is done and no extra packets are sent to the interface.

The Port P1 example allows a reduction of the routing table size from four entries to a single entry. If the reduction had been from 20 bits to 16 bits, instead of from 20 to 18 bits, it also would have resulted in traversing one less stage in the forwarding table tree, thus improving throughput.

The routing protocol might be expected to do this simple aggregation, making summarization by router 100 unnecessary. While this might be true if all routes are learned by the same routing protocol, it may not be true if the routes were learned through different routing protocols or if some of the routes were provisioned.

The second type of summarization is more aggressive. The second type of summarization allows some packets to be forwarded that otherwise would be dropped or sent to the default route. It is characterized by defining a port to which to send extra packets that would otherwise be dropped or sent to a default route. The extra packets belong to a subnet that is a superset of the component subnets. That is, the subnet of the extra packets has a prefix that is shorter than the prefix of the forwarding subnet, but whose prefix matches the most significant portion of only one other forwarding table entry. Ports P2 and P3 in FIG. 3 are examples of the second type of summarization. Sending these packets to a best match port is a mild form of the "always route" philosophy.

In the case of Port P2, three of the four 20-bit sub-prefixes of the 18 bit prefix are fully defined. That is, for the three routes having 20-bit prefixes beginning with [9D.0.3.4x.xx], [9D.0.3.5x.xx], and [9D.0.3.6x.xx], the third bytes are [0100xxxx], [0101xxxx], and [0110xxxx]. A fourth route beginning with [9D.0.3.7x.xx] is missing, wherein the third byte is [0111xxxx]. The fourth 18-bit prefix is only partially defined. It is divided into two 24-bit prefixes, [9D.0.3.70.xx] and [9D.0.3.7D.xx], which cover only two of the sixteen possible sub-prefixes. However, if it is assumed that routes beginning with [9D.0.3.7x.xx] are associated with Port P2, then the first two bits of all of the third bytes are all [0.1] and the external 18-bit prefix for Port P2 begins with the 3-byte sequence [9D.0.3.4x . . . ], where the third byte is equal to [01xxxxxx].

In the first level of summarization, the two 24-bit prefixes are treated like a single 20-bit prefix. Then, a second level of summarization is done using the first summarization technique, resulting in an 18-bit prefix. The only external effect of this summarization is that packets for the missing fourteen 24-bit prefixes having third bytes between 70 and 7F are sent out Port P2. However, these packets are sent along a path that is likely to know more about them, since the routers on this path already know about routes with similar prefixes (i.e., [9D.0.3.70.xx] and [9D.0.3.7D.xx]). This summarization reduces the number of routes in the forwarding table from five to one. It also reduces the number of stages in the tree search by one for the routes with the 24 bit prefix, since tree stages are based on nibbles and there is one less nibble.

The example shown on Port P3 is similar, except one of the subnets is entirely missing, instead of being partially missing. In this case, routes beginning with [9D.0.3.8x.xx], [9D.0.3.9x.xx], and [9D.0.3.Ax.xx] are defined, where the third bytes are [1000xxxx], [1001xxxx], and [1010xxxx], respectively. However, there are no routes beginning with [9D.0.3.Bx.xx], where the third byte is [1011xxxx].

This case is handled just like the Port P2 case. The fact that a subnet is missing is ignored. The packets for the missing subnet are assumed to be associated with Port P3 and are sent out Port P3. If it is assumed that routes beginning with [9D.0.3.Bx.xx] are associated with Port P3, then the first two bits of all of the third bytes are all [10] and the external 18-bit prefix for Port P2 begins with the 3-byte sequence [9D.0.3.8x . . . ], where the third byte is equal to [10xxxxxx]. In this case, the number of routes in the forwarding table is reduced from three to one.

The third type of summarization is an even more aggressive form of summarization. In this case, packets with unknown routes are sent out a best match port that has no known component routes. The port is selected from prefixes that match to a smaller depth. This method of summarization is similar to a default route, but does use some prefix information to determine the port. This is a more aggressive form of the "Always Route" philosophy.

By way of example, the third type of summarization may be illustrated by a default route associated with Port P1 that begins with the 16-bit prefix [9D.0.3.xx.xx]. Port P1 is already associated with the external 18-bit prefix [9D.03.0x.xx], wherein the third byte is [00xxxxxx]. Port P2 is already associated with the external 18-bit prefix [9D.0.3.4x.xx], wherein the third byte is [01xxxxxx]. Port P3 is already associated with the external 18-bit prefix [9D.0.3.8x.xx], wherein the third byte is [10xxxxxx]. The only external prefix missing is the 18-bit prefix [9D.0.3.Cx.xx], wherein the third byte is [11xxxxxx].

Three of the four 18-bit prefixes are assigned to ports, but there is no routing information available on the fourth prefix. All three of the 18-bit prefixes match the fourth 18-bit prefix to an equal depth (16 bits). Thus, the port for this subnet is chosen arbitrarily, namely Port P1. Typically, it is chosen to be the first route in the previous trie tree stage of the forwarding search tables. In this case, packets with unknown routes are sent out a best match port that is not unique. The port is selected arbitrarily among prefixes that match to an equal depth. Since a longest prefix match is used, only the packets not matching any of the longer 18-bit prefix routes will use this 16-bit default route.

There is one other form of an "Always Route" technique that is used in many conventional routers: a default route. This is a path to an external router to which the current router sends all packets that the router does not know how to handle. Packets that do not match any known routes are sent to this default route if one is defined and are dropped if a default route is not defined. Router 100 supports this type of default route. However, router 100 uses the summarization techniques described above to choose more likely routes than the traditional default route.

Internal route summarization allows router 100 to conserve forwarding table space, as well as control plane bandwidth. Also, it tends to lead to smaller prefixes being used, thus reducing the number of stages in the RPM trie tree search in many cases and thereby reducing the data plane workload. External route summarization and the "always route" approach enable router 100 to save forwarding table space and conserve control plane bandwidth. In addition, these techniques reduce the depth of the trie tree search, thus reducing the data plane workload. In addition, the "always route" technique allows packets to be routed based on a portion of their prefix, instead of being dropped or sent to the default route as in traditional routers. This improves the number of packets successfully routed through the network.

In the descriptions of router 100 above, the trie tree search tables consume one nibble (i.e., 4 bits) of the subnet mask in each stage of the trie tree. This is not a requirement, however, and the descriptions that follow discuss techniques for searching the trie tree tables using non-nibble subnet masks. According to the principles of the present invention, the control processors in router 100 provide for handling non-nibble subnet masks by filling all entries in the trie tree search table in memory 350 with the forwarding table entry for the route for all combinations of "Don't Care" bits for the last mask nibble. Additionally, the control processors of router 100 set a masked flag for every non-nibble subnet mask entry to aid in propagation of the default route.

There are three flags associated with every trie tree table entry: 1) the end flag (EF), 2) the subnet flag (SF), and 3) the masked flag (MF). Each end flag is a bit that indicates whether the entry in the table is a branch or a leaf. The control plane processor (e.g., CPP 310, CPP 320) writes the end flag bit for each entry for use by the data plane processors (i.e., microengines 222, 224). The data plane processors read this flag to determine whether the end of the trie tree search (i.e., a leaf) has been reached.

The subnet flags and the masked flags are used to determine whether a defined route ends at the corresponding trie tree entry. The subnet flag is used for nibble-oriented subnet masks and the masked flag is used for non-nibble-oriented subnets. When flooding (or filling) the trie tree to fill in undefined locations as part of the "always route" technique, the subnet flags and the masked flags are used to determine what default route to carry on to the next stage in the trie tree. The first entry for which the subnet flag is set is used as the default route. If no entries in a table have the subnet flag set, then the first entry for which the masked flag is set (i.e., equals Logic 1) is used. If none of the subnet and masked flags are set (i.e., all Logic 0), the default route from the previous stage is used. According to an exemplary embodiment of the present invention, the initial default route is the router default route for the payload type and Class of Service (CoS).

FIG. 6A-6E illustrate the building of trie tree search tables in memory 350 using non-nibble subnet masks and the flooding of default routes according to the principles of the present invention. In FIGS. 6A-6E, it is assumed that a control plane processor (e.g., CPP 310) has already constructed an initial stage search structure in content addressable memory (CAM), which is searched by the data plane processor (e.g., a microengine 222) as described in U.S. patent application Ser. No. 10/794,506, incorporated by reference above. It is further assumed that the CAM search result was a branch address that indexed into first stage of the multiple trie tree search table stages. It is also assumed that the first stage of the trie tree search table was a branch entry. The result from the first trie tree stage is then used to search further stages of the trie trees.

According to an exemplary embodiment, CCP 310 constructs the CAM entry using a 32-bit search key comprising, for example, one or more of service (COS) bits, packet type bits (IPv4, IPv6, MPLS), and some of the most significant bits of the destination address. Thereafter, CCP 310 consumes an additional 4-bit symbol (i.e., a nibble) during the construction of each subsequent trie tree stage. The search of each stage by the data plane processors results in either a branch result or a leaf result. A branch result indexes into another search table. A leaf result leads to a pointer to a forwarding table entry. As will be seen below, the subnet mask is used when constructing the tables to define the leaf locations. The search ends when a leaf of the tree is reached, as indicated by the end flag (EF) of the entry. As will be seen below the default route flooding ("always route") of the trie tree search table results in a leaf always being reached at the end of a search string. Thus, there are no unknown or invalid routes.

Since each stage consumes a nibble, it is clear how to handle subnets with an integer number of nibbles, such as a 16-bit subnet. To handle subnet masks of lengths that are not a multiple of 4 bits, all possible combinations of the "Don't Care" bits are filled with the route.

Figure 6A:
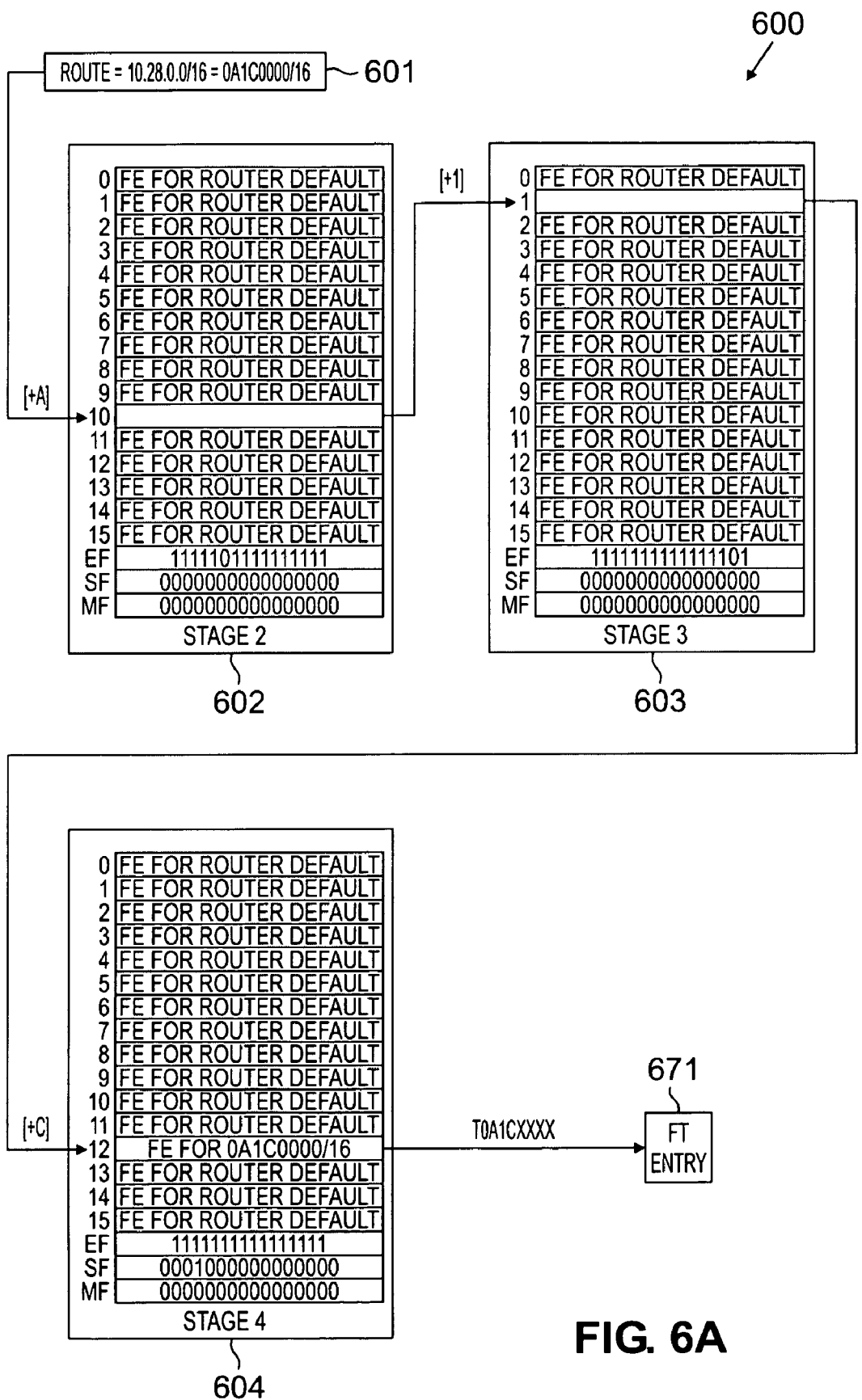
FIGS. 6A-6E illustrate the building of trie tree search tables using non-nibble subnet masks and the flooding of default routes according to the principles of the present invention.
Figure 6B:
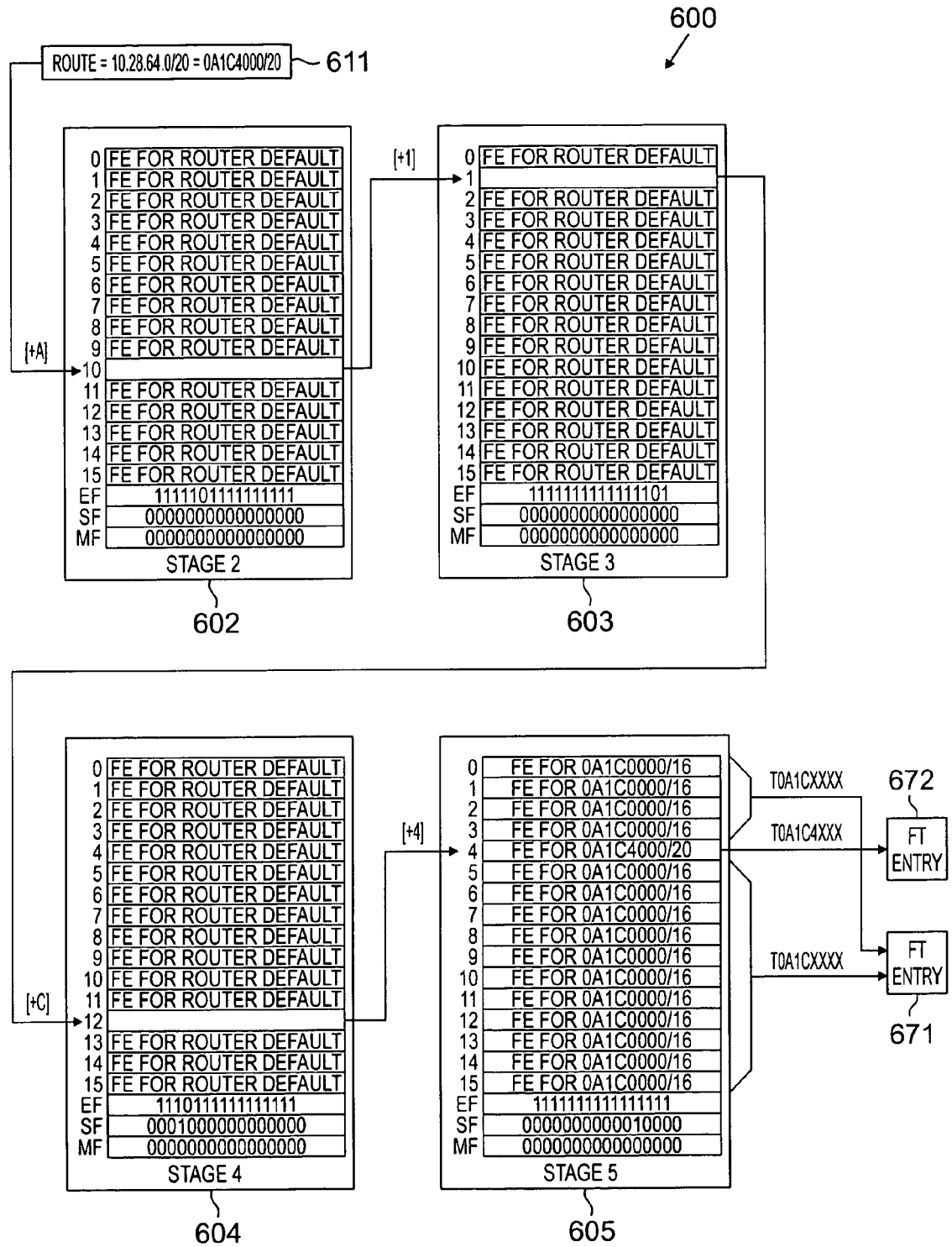
Figure 6C:
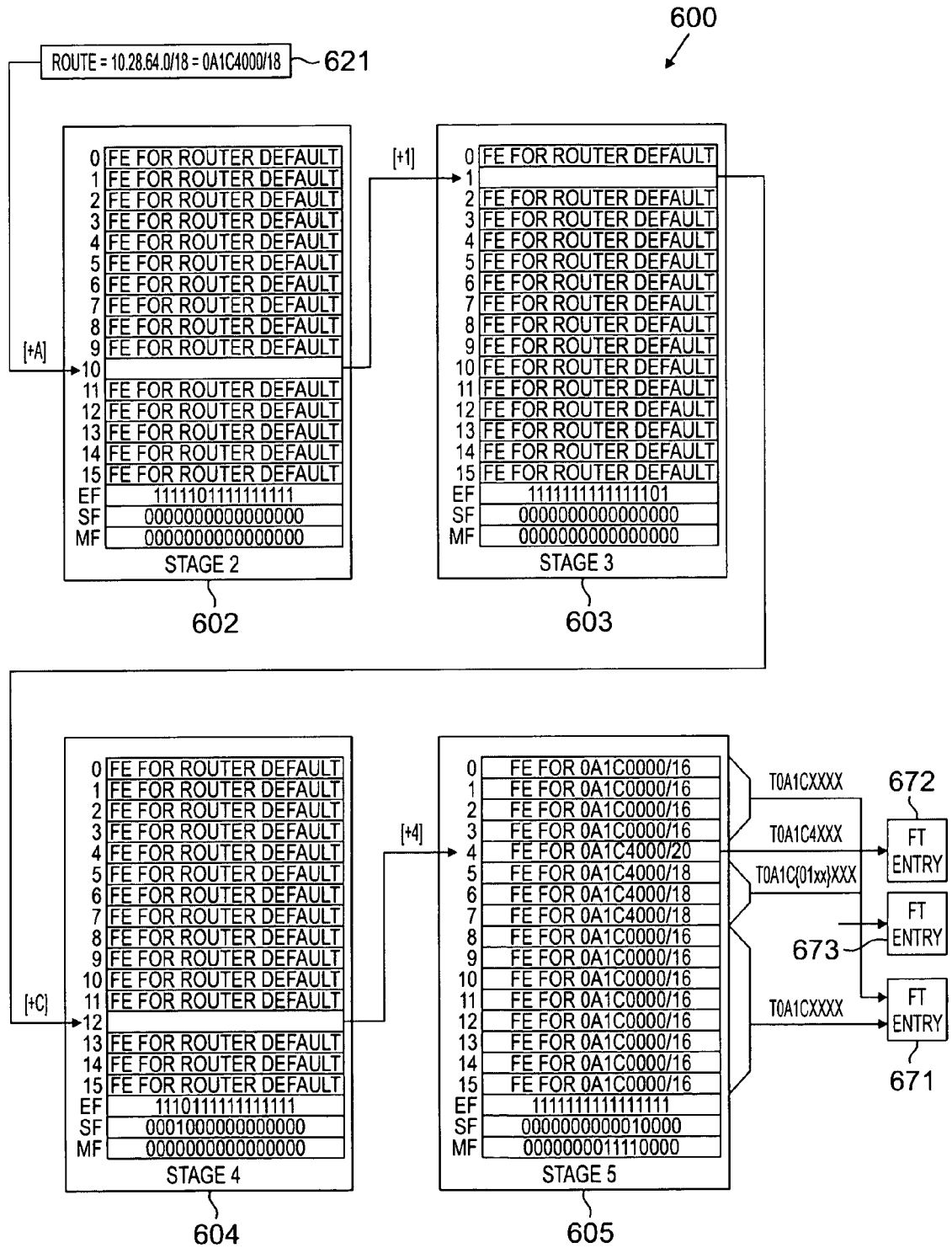

FIGS. 6A-6C illustrate the building of the trie tree tables by the control plane processor (e.g., CPP 310) for subnet masks of differing lengths, including subnet mask lengths equal to an integer (or whole) number of nibbles and subnet mask lengths that end on a non-nibble boundary. In these examples, it is assumed that an IPv4 address is being searched. It will be understood that IPv6 addresses are handled in a similar manner.

FIG. 6A illustrates trie tree stage 602, trie tree stage 603, and trie tree stage 604 in memory 350. Trie tree stages 602, 603 and 604 are labeled Stage 2, Stage 3 and Stage 4, respectively. Stage 2, 3 and 4 are initially filled with the forwarding table entry (FE) for the router default route. The first route learned (route 601) has the 16-bit subnet mask 10.28.0.0/16 (or 0A1C0000/16). The search result from the CAM stage and the first trie tree stage (packet type, CoS, and most significant address nibble 0) is a branch result called "path T0". The Stage 2 table for path T0, the Stage 3 table for the path T0A, and the Stage 4 table for the path T0A1 are created in FIG. 6A. Since the "always route" philosophy is used, it is assumed that every entry is a leaf, unless a specific path with branches is entered. Thus, the end flag (EF) bit for each new stage is initialized to Logic 1 for a leaf node. The subnet flag (SF) and the masked flag (MF) remain cleared, indicating that there has been no route defined that ends here.

The Stage 1 result for path T0 results in a pointer to the top of the trie tree table in Stage 2 (stage 602). Entry 10 in Stage 2 is indexed by the next address nibble (A=1010). Entry 10 contains a branch entry that points to the start of the Stage 3 table for this path (T0A). The end flag (EF) for entry 10 in Stage 2 is set to Logic 0 to indicate that entry 10 is a branch. Entry 1 in Stage 3 is indexed by the next address nibble (1=0001). Entry 1 in Stage 3 contains a branch entry that points to the start of the Stage 4 table for this path (T0A1). The end flag (EF) for entry 1 in Stage 4 also is set to Logic 0 to indicate that entry 1 is a branch. Finally, entry 12 in Stage 4 is indexed by the next address nibble (C=1100). Entry 12 in Stage 4 contains a leaf entry that points to forwarding table (FT) entry 671 for this path (T0A1C). The end flag (EF) for entry 12 was initialized to Logic 1, so the end flag does not need to be changed. The subnet flag (SF) for entry 12 is set to Logic 1 for this leaf node, indicating that a subnet terminates at entry 12 (i.e., leaf is reached).

In FIG. 6B, The second route learned (route 611) has the 20-bit subnet mask 10.28.64.0/20=0A1C4000/20. Route 611 follows the same path as route 601 up through Stage 4. However, in trie tree stage 605 (i.e., Stage 5) a table must be created for the path T0A1C and entries 0-3 and entries 5-15 must filled with pointer to forwarding table entry 671 for the route 10.28.0.0/16 from the previous stage. CPP 310 adds forwarding table entry (FT) 672 associated with the new longer prefix (10.28.64.0/20) into entry 4 in Stage 5 for the new route T0A1C4. The subnet flag in Stage 5 is set for entry 4 to indicate that a subnet terminates at entry 4 (i.e., leaf is reached).

The subnet masks for routes 601 and 611 both end on nibble boundaries. However, in FIG. 6C, the third route learned (route 621) has the 18-bit subnet mask 10.28.64.0/18=0A1C4000/18. Route 621 ends in the middle of a nibble. CPP 310 handles route 621 by placing a pointer to forwarding table (FT) entry 673 for subnet mask 10.28.64.0/18 into all entries in the table in Stage 5 that are covered by subnet mask 10.28.64.0/18. In this case, the last nibble of the mask is 0100, where only the first 2 bits are part of the mask. Thus, the mask is 01xx and entry 4 (0100), entry 5 (0101), entry 6 (0110), and entry 7 (0111) are covered by subnet mask 10.28.64.0/18. This is indicated by setting the masked flag (MF) bits for entries 4-7. However, entry 4 (0100) already has a terminating route, indicated by the SF and EF flags, that relates to a longer (20 bit) route (i.e., subnet mask 10.28.64.0/20). Thus, CPP 310 only overwrites entries 5-7, which are terminating entries from the previous stage and thus have a shorter prefix.

CPP 310 uses the end flag (EF) bits, subnet flag (SF) bits, and masked flag (MF) bits to determine how to flood (fill) the default routes through the trie tree table structure. In the examples in FIGS. 6A-6C, it can be seen that the empty Stage 2 through 4 trie tree table entries are set to point to the router default forwarding table entry (FE) for the specified traffic type and class of service. Since there are no terminating routes above these levels, as seen by the SF bits, the router default route is used.

When Stage 5 is created, it is a further breakdown of one of the terminating routes, as seen by the subnet flag in Stage 4. Hence, the forwarding table pointer in entry 12 in Stage 4 is replicated in the Stage 5 trie tree table. However, the forwarding table pointer for the specific longer route is overwritten in entry 4 of Stage 5. The subnet flag is set for entry 4, indicating that a specific route ends at that point.

When the 18-bit route 621 is learned, CPP 310 overwrites the Stage 5 entries that correspond to the 18-bit mask. In this case, four entries are overwritten. However, CPP 310 must only overwrite Stage 5 entries for routes with shorter masks and must not overwrite entries with longer masks. Thus, the three 16-bit routes in entries 5-7 are overwritten and the one 20-bit route in entry 4 is not overwritten. CPP 310 determines which routes to overwrite from the subnet flags of Stage 5. The only entry with the subnet flag set (indicating a termination at the end of the nibble) is entry 4, so entry 4 must not be changed. There are no masked bits set initially, so there are no entries that have a different non-nibble oriented mask and the remaining three entries are replaced with the 18-bit mask route.

Figure 6D:
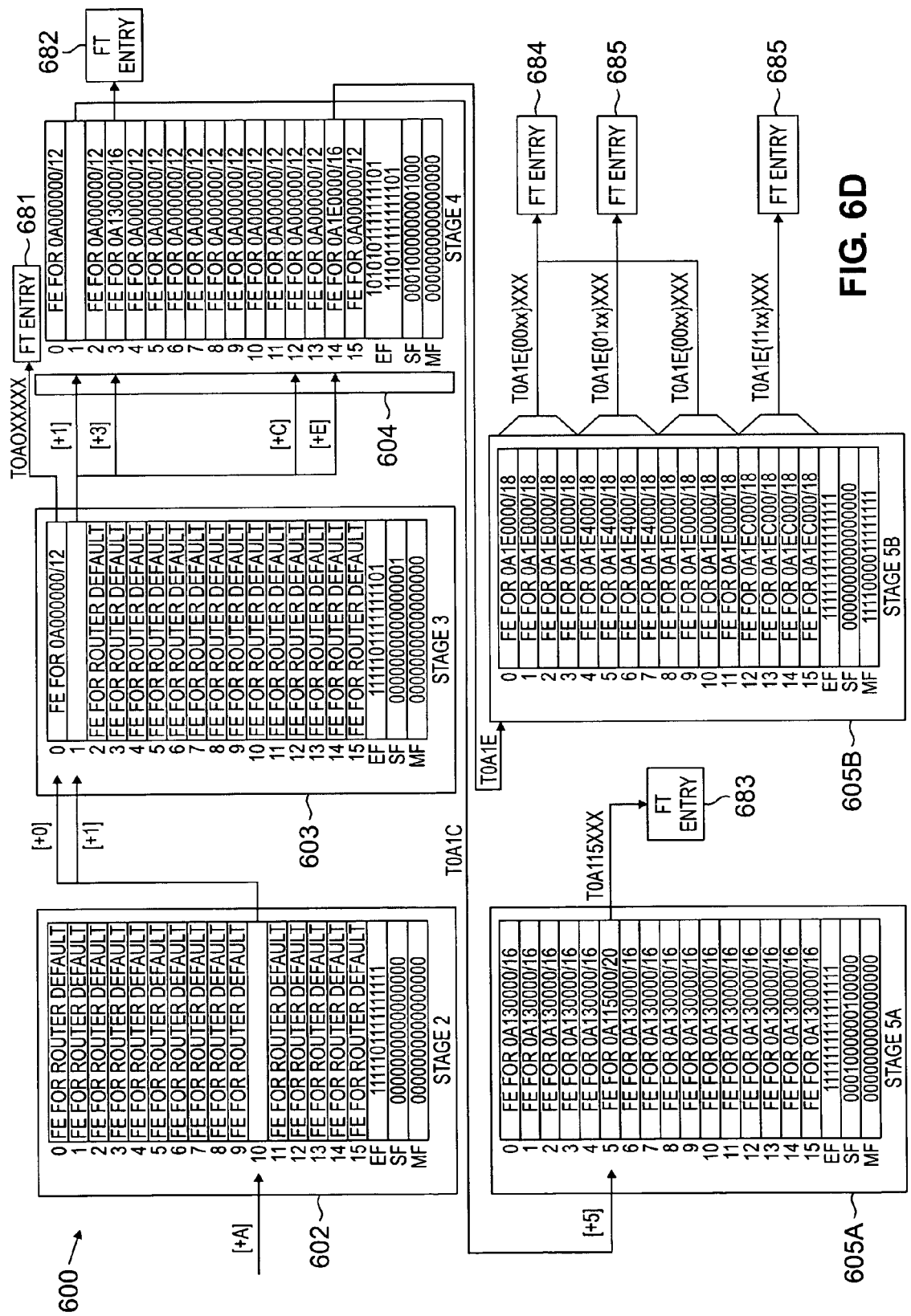
Figure 6E:
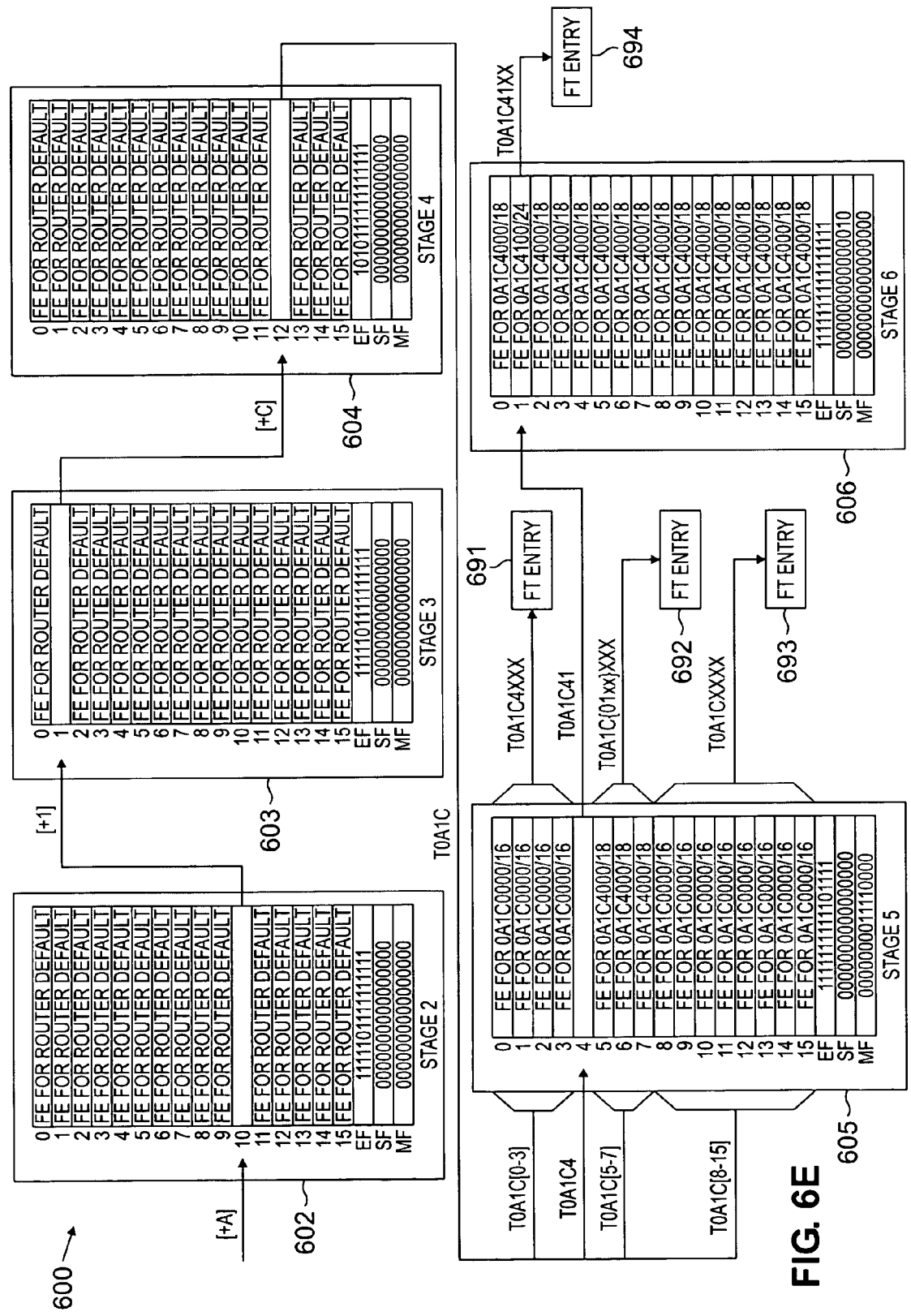

FIGS. 6D and 6E illustrate the structure of the trie tree tables when route summarization is implemented and also illustrates the filling in (flooding) of the default routes. Several new routes are learned in FIGS. 6D and 6E. Stage 4 is shown with two sets of end flags: a first set (top row) for the 16-bit subnet mask 0A1E0000/16 and a second set (bottom row) for the when the 18-bit subnet masks 0A1E0000/18, 0A1E4000/18 and 0A1EC000/18 are learned.

The first route has the 12-bit subnet mask 10.0.0.0/12=0A000000/12 and terminates at Stage 3. The router default route in entry 0 of the Stage 3 trie tree table is replaced with a pointer to forwarding table (FT) entry 681 for the specified 12 bit subnet. The subnet mask for entry 0 is set, indicating that this is the termination of a route (i.e., a leaf).

When CPP 310 learns the first route, CPP 310 also updates the default routes in the Stage 4 trie tree table. Since there now is a longer prefix route that terminates in a previous stage as indicated by a set subnet flag, the pointers for the default routes in the Stage 4 trie tree table are replaced with pointer to the forwarding table entry for the longer prefix route (0A050000/12) and the subnet flags and mask flags are cleared. The second route that CPP 310 learns has the 16-bit subnet mask 10.19.0.0/16=0A130000/16. The default route in entry 3 in the Stage 4 trie tree corresponding to this 16-bit subnet mask is replaced with a pointer to forwarding table (FT) entry 682 for this route.

Next, CPP 310 learns three similar routes: 1) 10.30.0.0/18=0A1E0000/18; 2) 10.30.64.0/18=0A1E4000/18; and 3) 10.30.192.0/18=0A1EC000/18. CP 310 sets the four entries corresponding to the partial nibble to point to the forwarding table entry for the route. This is seen in the Stage 5B trie tree table. There are two choices for filling the rest of this table with a default route: 1) flood with the longest default route along this path; or 2) flood with the forwarding table entry for one of the current level routes. When a non-nibble subnet mask forces the creation of a new stage, the second choice is preferred.

In this example, CPP 310 fill the entire Stage 5 trie tree table with the pointer for the first route learned (10.30.0.0/18=0A1E0000/18). Thereafter, CPP 310 overwrites this pointer in the portions of the table covered by the prefixes for the next two similar routes learned (10.30.64.0/18=0A1E4000/18 and 10.30.192.0/18=0A1EC000/18). The masked flag bits are set for each of the entries corresponding to one of these non-nibble oriented subnets, so only the entries that do not have the masked bit or the subnet bit (indicating a longer route) set are the ones using the default route pointer for the first of the similar routes (10.30.0.0/18=0A1E0000/18). Thus, the missing routes for entries 8-11 are treated like the first of the three similar routes.

FIG. 6D illustrates an example of filling (or flooding) the trie tree tables with the longest default route along the path for the route having the 20-bit subnet mask 10.17.80.0/20=0A115000/20. This route causes the creation of a new trie tree table as shown in Stage 5A in FIG. 6D. The new route is entered in entry 5 of stage 5A. As the path through the tables to this route is traversed, longer prefix default routes may be learned. In Stage 2, there are no terminating routes as seen by the subnet and masked flags, so the forwarding table entry (FE) for the router default route carries on to Stage 3. In Stage 3, there is a terminating route (i.e., the 12-bit mask route in entry 0) as seen in the subnet flags, so the terminating route becomes the new longest prefix default route. In Stage 4, there are two terminating routes (entry 3 and entry 12) as seen by the subnet flags. Since there are multiple terminating routes, the first terminating route in the table is used as the longest prefix default route (i.e., entry 3). Thus, the undefined entries in the upper Stage 5 trie tree table, as indicated by zeros in the subnet flag and masked flag, are filled with the first Stage 4 default route, namely the entry 3 route.

FIG. 6E illustrates an example of flooding of default routes based on non-nibble subnet masks. In the illustrated example, the final state from FIGS. 6B and 6C are used as a starting point. The route with the 20-bit subnet mask, 0A1C4000/20, is replaced with a route with a 24-bit subnet mask 0A1C4100/24. In response to the new route, CPP 310 creates a trie tree table in Stage 6, with the specified route in a single location, entry 1. Since there are no routes in the Stage 5 trie tree table along this path with the subnet flag set, the first route with the masked flag set is used as the longest prefix default route in the Stage 6 trie tree table. If there was a route entry with the subnet mask bit set in the Stage 5 trie tree table, it would be used instead because it would have a longer prefix (i.e., a 20-bit prefix, instead of an 18-bit prefix).

In this implementation if there are no subnet mask bits set and there are multiple masked routes terminating at a trie tree stage, the first masked route is the one used, regardless of length. Alternatively, preference may be given to the longest subnet mask instead. For example, if there were an 18-bit subnet mask before a 19-bit subnet mask in a trie tree stage, the 18-bit subnet would be the default route for the following stages. Prioritization of non-nibble subnet masks based on length could be handled in several ways, such as using a two-bit field for each entry to indicate how many bits in the nibble are defined by the masked subnet (from 0 through 3). The subnet flag would still be used for subnets ending on a nibble boundary (4 bits defined). Another way to prioritize non-nibble subnet masks would be to have the control plane processor look up the route for these non-nibble cases to determine the longest one.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:
a switch fabric;
and a plurality of routing nodes coupled to said switch fabric, wherein each of said plurality of routing nodes comprises:
a trie tree search table for storing routing information associated with received variable length subnet masks, wherein said trie tree search table is comprised of a plurality of stages that are searched by N-bit address symbols derived from said received variable length subnet masks; and
a control processor configured to generate said plurality of stages associated with said trie tree search table, wherein said control processor generates for each entry in a first one of said plurality of stages: i) an end flag indicating whether said each entry is a leaf or a branch; 2) a subnet flag indicating whether a subnet mask ends at said each entry; and 3) a masked flag indicating whether a subnet mask ending at said each entry ends on a boundary of an N-bit address symbol associated with said each entry.

2. The router as set forth in claim 1, wherein said N-bit address symbols comprise 4-bit address nibbles.

3. The router as set forth in claim 2, wherein said control processor determines default routing information to be stored in entries in said first stage according to values of end flags, subnet flags, and masked flags associated with said entries in said first stage.

4. The router as set forth in claim 3, wherein said control processor determines said default routing information to be stored in said entries in said first stage according to a value of an end flag associated with an entry in a preceding stage associated with said first stage.

5. The router as set forth in claim 4, wherein said control processor stores in a first entry in said first stage a first default route associated with a first entry in said preceding stage if a subnet flag associated with said first entry in said preceding stage indicates that a subnet mask ends at said first entry in said preceding stage.

6. The router as set forth in claim 5, wherein said control processor stores in said first entry in said first stage a second default route associated with said first entry in said first stage if a subnet flag associated with said first entry in said first stage indicates that a subnet mask ends at said first entry in said first stage.

7. The router as set forth in claim 6, wherein said control processor stores in a second entry in said first stage a third default route associated with a second entry in said first stage if a mask flag associated with said second entry in said first stage indicates that a subnet mask associated with said second entry does not end on a boundary of an N-bit address symbol associated with said second entry.

8. The router as set forth in claim 7, wherein said control processor stores said third default route in at least a third entry in said first stage, wherein said at least a third entry is determined by at least one don't care bit associated with said subnet mask associated with said second entry.

9. A communication network comprising a plurality of routers that communicate data packets to one another and to interfacing external devices, each of said plurality of routers comprising:
a switch fabric; and
a plurality of routing nodes coupled to said switch fabric, wherein each of said plurality of routing nodes comprises:
a trie tree search table for storing routing information associated with received variable length subnet masks, wherein said trie tree search table is comprised of a plurality of stages that are searched by N-bit address symbols derived from said received variable length subnet masks; and
a control processor configured to generate said plurality of stages associated with said trie tree search table, wherein said control processor generates for each entry in a first one of said plurality of stages: 1) an end flag indicating whether said each entry is a leaf or a branch; 2) a subnet flag indicating whether a subnet mask ends at said each entry; and 3) a masked flag indicating whether a subnet mask ending at said each entry ends on a boundary of an N-bit address symbol associated with said each entry.

10. The communication network as set forth in claim 9, wherein said N-bit address symbols comprise 4-bit address nibbles.

11. The communication network as set forth in claim 10, wherein said control processor determines default routing information to be stored in entries in said first stage according to values of end flags, subnet flags, and masked flags associated with said entries in said first stage.

12. The communication network as set forth in claim 11, wherein said control processor determines said default routing information to be stored in said entries in said first stage according to a value of an end flag associated with an entry in a preceding stage associated with said first stage.

13. The communication network as set forth in claim 12, wherein said control processor stores in a first entry in said first stage a first default route associated with a first entry in said preceding stage if a subnet flag associated with said first entry in said preceding stage indicates that a subnet mask ends at said first entry in said preceding stage.

14. The communication network as set forth in claim 13, wherein said control processor stores in said first entry in said first stage a second default route associated with said first entry in said first stage if a subnet flag associated with said first entry in said first stage indicates that a subnet mask ends at said first entry in said first stage.

15. The communication network as set forth in claim 14, wherein said control processor stores in a second entry in said first stage a third default route associated with a second entry in said first stage if a mask flag associated with said second entry in said first stage indicates that a subnet mask associated with said second entry does not end on a boundary of an N-bit address symbol associated with said second entry.

16. The communication network as set forth in claim 15, wherein said control processor stores said third default route in at least a third entry in said first stage, wherein said at least a third entry is determined by at least one don't care bit associated with said subnet mask associated with said second entry.

17. For use in a router comprising i) a switch fabric and ii) a plurality of routing nodes coupled to the switch fabric, each of the plurality of routing nodes comprising a trie tree search table for storing routing information associated with received variable length subnet masks, wherein the trie tree search table comprises a plurality of stages that are searched by N-bit address symbols derived from the received variable length subnet masks, a method of generating the plurality of stages associated with the trie tree search table comprising the steps of:

generating for each entry in a first one of the plurality of stages an end flag indicating whether said each entry is a leaf or a branch;

generating for each entry in the first stage a subnet flag indicating whether a subnet mask ends at the each entry; and generating for each entry in the first stage a masked flag indicating whether a subnet mask ending at the each entry ends on a boundary of an N-bit address symbol associated with the each entry.

18. The method as set forth in claim 17, wherein the N-bit address symbols comprise 4-bit address nibbles.

19. The method as set forth in claim 18, further comprising the step of determining default routing information to be stored in entries in the first stage according to values of end flags, subnet flags, and masked flags associated with the entries in the first stage.

20. The method as set forth in claim 19, further comprising the step of determining the default routing information to be stored in the entries in the first stage according to a value of an end flag associated with an entry in a preceding stage associated with the first stage.

* * * * *

UNITED STATES PATENT AND TRADEMARK OFFICE
CERTIFICATE OF CORRECTION

PATENT NO. : 7,486,672 B2 Page 1 of 1
APPLICATION NO. : 11/015737
DATED : February 3, 2009
INVENTOR(S) : Jack C. Wybenga, Patricia K. Sturm and Patrick W. Ireland It is certified that error appears in the above-identified patent and that said Letters Patent is hereby corrected as shown below:

Column 19, claim 1, line 58, delete "i)" and replace with --1)--.

Signed and Sealed this

Twenty-ninth Day of December, 2009

David J. Kappos
*Director of the United States Patent and Trademark Office*